Figure 1:
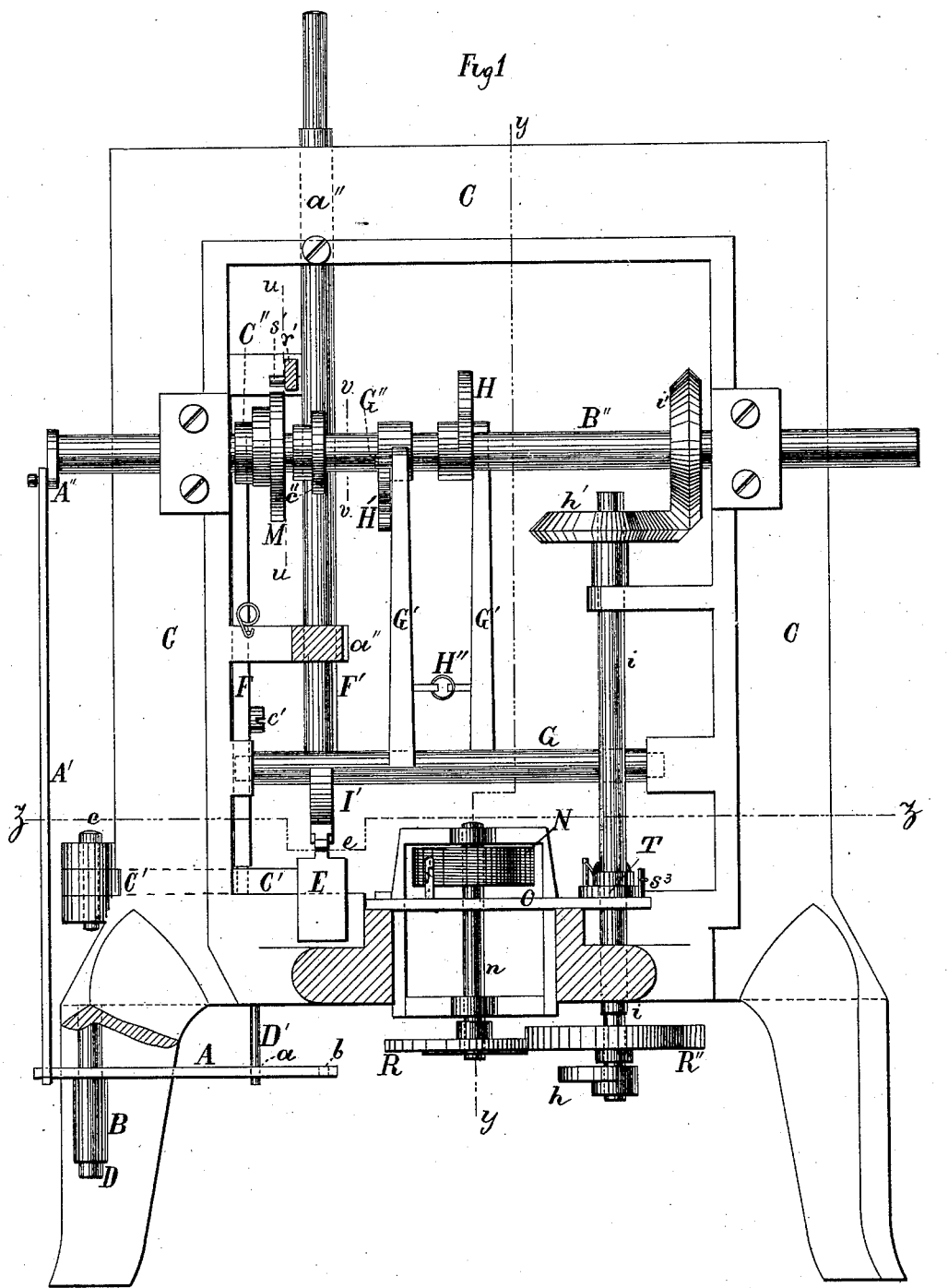

(No Model.)  3 Sheets—Sheet 1.

T. J. SLOAN.
MACHINE FOR MAKING THREADED WIRE NAILS, WOOD SCREWS, &c.

No. 338,446. Patented Mar. 23, 1886.

Witnesses
Rudolf Kjellman
Danforth Becker

Inventor
Thomas J. Sloan
per James A. Whitney
Attorney (No Model.) 3 Sheets—Sheet 2.
T. J. SLOAN.
MACHINE FOR MAKING THREADED WIRE NAILS, WOOD SCREWS, &c.
No. 338,446. Patented Mar. 23, 1886.
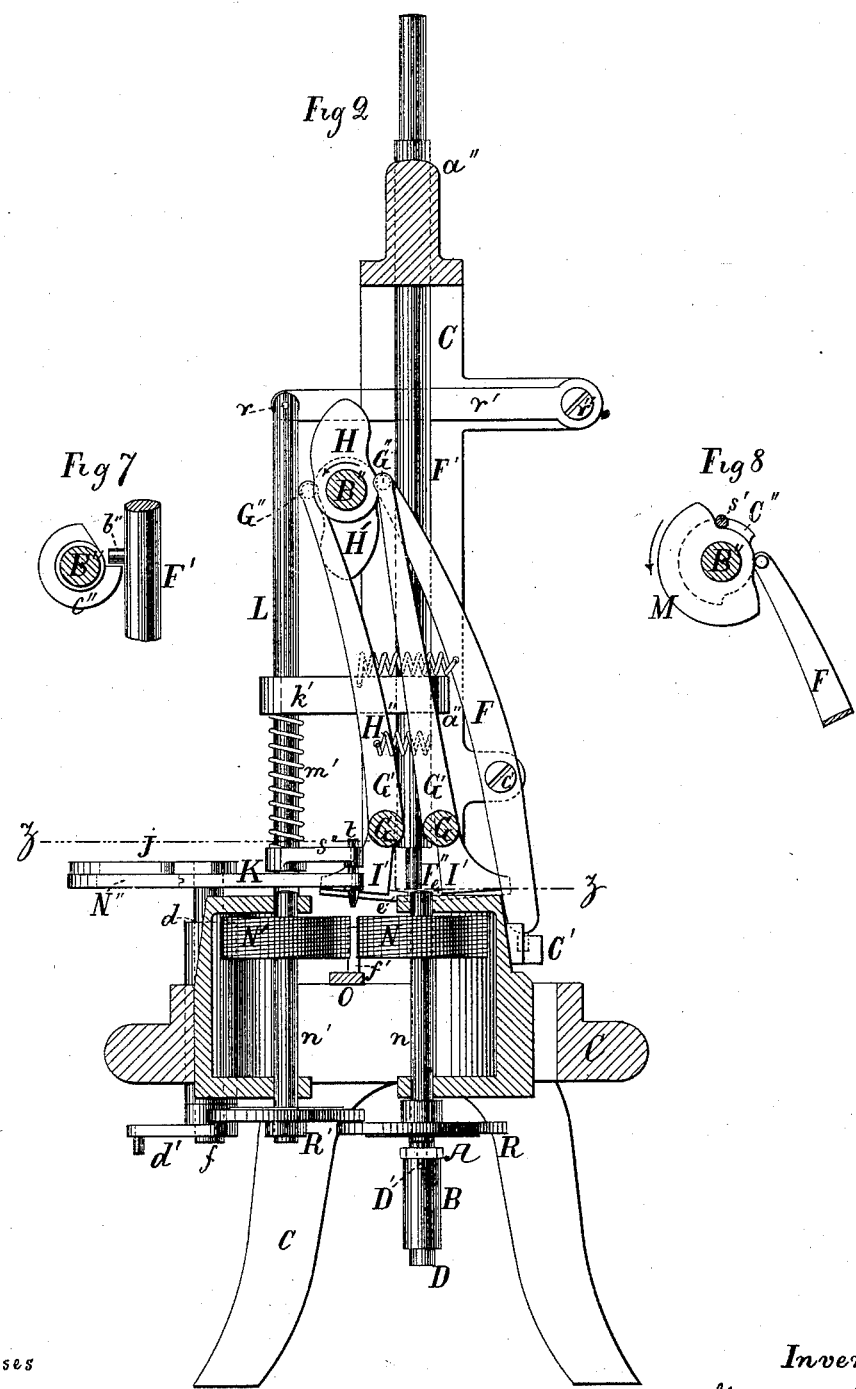

(No Model.) 3 Sheets—Sheet 3.
T. J. SLOAN.
MACHINE FOR MAKING THREADED WIRE NAILS, WOOD SCREWS, &c.
No. 338,446. Patented Mar. 23, 1886.
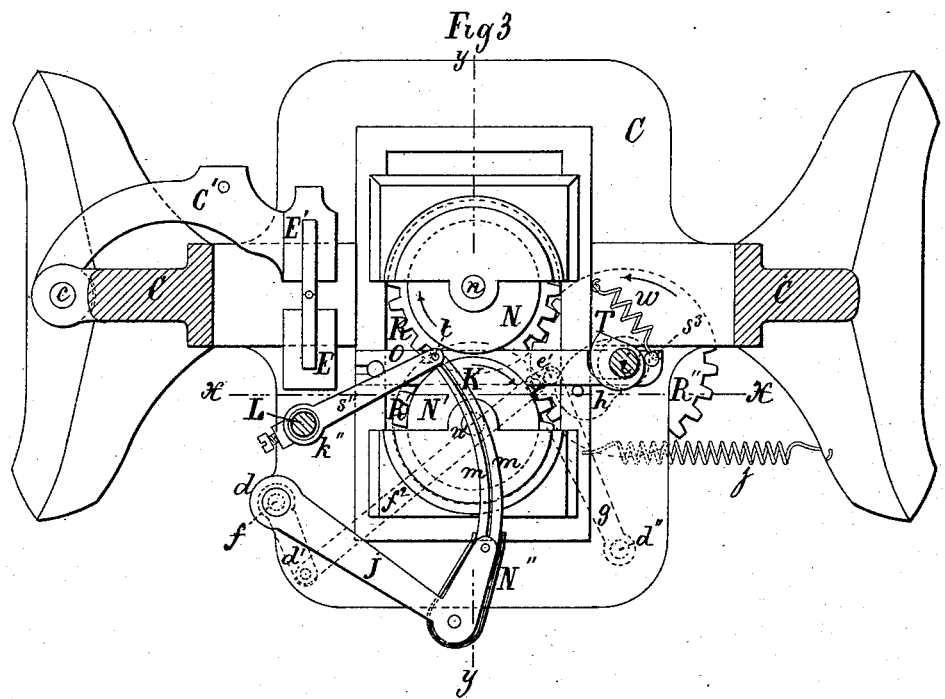
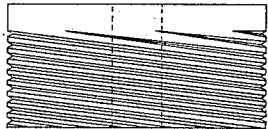
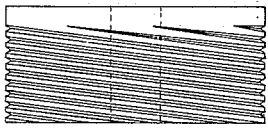
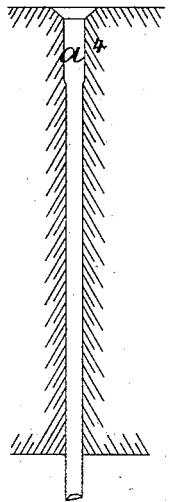
Witnesses
Rudolph A. Gillman
Danforth Beckes
Inventor
Thomas J. Sloan
per James A. Whitney
Attorney

UNITED STATES PATENT OFFICE.

THOMAS J. SLOAN, OF ST. MONDE, FRANCE.

MACHINE FOR MAKING THREADED WIRE NAILS, WOOD-SCREWS, &c.

SPECIFICATION forming part of Letters Patent No. 338,446, dated March 23, 1886.

Application filed February 8, 1883. Renewed November 21, 1885. Serial No. 183,519. (No model.) Patented in France July 13, 1880, No. 137,788, and July 13, 1881, No. 143,921.

*To all whom it may concern:*

Be it known that I, THOMAS J. SLOAN, formerly of the city, county, and State of New York, but now of St. Monde, Seine, in the Republic of France, have invented certain Improvements in Means for Making Threaded Wire Nails, Wood-Screws, &c., of which the following is a specification.

This invention is designed to provide an effective and rapidly-operating means for manufacturing spirally-threaded wire nails, wood-screws, screw-bolts, and the like; and the invention comprises certain novel combinations of parts whereby said objects are effectually secured.

Figure 1 is a vertical transverse section taken through the line $x\ x$ of Fig. 3 of an apparatus constructed according to my invention. Fig. 2 is a vertical section by a plane at right angles to that of Fig. 1, and through the line $y\ y$ of Figs. 1 and 3. Fig. 3 is a horizontal section taken through the line $z\ z$ of Figs. 1 and 2; and Figs. 4, 5, 6, 7, and 8 are detail views, on a larger scale, of certain parts included in the apparatus.

In all substantial respects the combinations of parts may be the same whether the apparatus is constructed for the purpose of manufacturing wire nails having a spiral groove or thread along their shanks, or for the manufacture of wood-screws, or for the manufacture of larger articles—such as wood-bolts, &c—the modifications in size, proportion, and arrangement of the several parts, according as the apparatus is to be constructed for one or the other of these classes of articles, being merely such as will be suggested by ordinary workshop skill or mechanical judgment.

A is the horizontal bar of the feeding device, which said bar is supported upon a vertical sleeve, B, which works upon a vertical guide or bearing, D, and which is also held in position by the vertical guide D', which plays through a suitable opening or slot, $a$, in the said bar A. A vertical movement is given to said bar A by means of a pitman, A', operated by a crank, A'', of a driving-shaft, B'', which may be arranged at the top of the frame C of the apparatus.

In the inner extremity of the bar A is a hole, $b$, through which passes the wire from which the nails are to be made, the said hole being in vertical line with and directly beneath the space between the two gripping-jaws, E E', above, one of which may be stationary while the other is laterally movable. The movable jaw E' is formed upon the end of a horizontally-swinging arm, C', the pivot of which is indicated at $c$. This arm is actuated by an upright lever, F, pivoted at $c'$, which has its lower end connected with the arm C', while its upper end is placed in due relation with the cam C'' on the driving-shaft B'', as represented in Fig. 8. The feeding device, of which the horizontal bar A is a part, does not differ materially from the feeding device of an ordinary wood-screw-making machine, and therefore need not be specifically set forth. Its operation is to feed the wire from a suitable reel intermittently upward between the jaws E E', which latter grip the said wire intermittently and hold the same preparatory to the heading operation, as will be readily understood by any one conversant with the art of manufacturing wood-screws, or with the art, as heretofore practiced, of making ordinary wire nails.

The upper extremity of the wire being gripped, as just described, a head is formed thereon by the descent of a hammer or die, F''', provided upon the lower end of a vertically-moving shaft, F', which is supported in suitable guides or bearings $a''$ on the frame C, the said shaft being provided with a lateral spur or stud, $b''$, as shown in Fig. 7, which is lifted by a toe, $c''$, on the driving-shaft B'', and allowed to descend by its own weight, either with or without the addition of power to increase the force of its descent, when the rotation of the said toe $c''$ brings the same away from underneath the spur or stud $b''$ of the shaft.

Two parallel shafts, G, are placed transverse to the machine—one upon each side of the vertical shaft F'—each of which is provided with an upwardly-extending arm, G', each of said arms G' being provided at its upper extremity with a stud, G'', projecting laterally therefrom across the face, respectively, of cams H H' upon the driving-shaft B''. The said arms G' are connected by a spiral spring, H'', which, by tending to draw them toward each other, keep their respective studs in contact with the respective cams H H' aforesaid.

Extended downward from each of the shafts G, and above the gripping-jaws E E', is a head, I', to each of which is fixed a die or cutter, e, the said dies or cutters of the two heads being arranged opposite each other, so that when the headed end of the wire is thrust upward to the requisite degree by the upward movement of the horizontal bar A—in other words, by the feeding device—the approach of the said cutters toward each other will sever the said headed end from the wire, this movement of the cutters being given by the action of the cams H H' upon the arms G' as the latter are swung apart by the action of the said cams, thereby bringing the cutters toward each other to sever the wire, as aforesaid.

It will be seen that the wire is first thrust up the requisite distance to be headed, then being thrust up farther a certain requisite distance, is severed, this movement of the wire to bring the headed portion in position for being cut off bringing that portion of the wire immediately below into position to be itself headed as soon as the severed and headed portion is removed. In order to provide for this removal of the severed "blank," as it may now be termed, mechanism is arranged as follows: Provided in suitable fixed bearings, d, is a vertical shaft, f, having at its lower end a crank-arm, d', which, by means of a connecting-rod, f², is attached to the free or movable extremity of a horizontally-swinging arm, g, pivoted as shown at d'', (shown by dotted lines in Fig. 3,) and having at its free or movable end a downwardly-projecting stud, e', which bears against the circumference of a horizontal cam, h, attached to the lower extremity of a vertical shaft, i, which, by bevel-pinions h' i', is geared with the driving-shaft B''. The downwardly-projecting stud e' is pressed against the circumference of the cam h by means of a spring, j, one end of which is attached to the horizontally-swinging arm g, while the other is attached to the adjacent portion of the fixed frame-work of the machine. The rotation of the horizontal cam h, therefore, communicates a rocking movement around its vertical axis to the vertical shaft f. Upon the upper end of said vertical shaft f is a horizontal arm, J, to which are pivoted the two halves m of nippers K, the said two halves or parts m of said nippers K being pressed toward each other by a spring, N''. The inner—that is to say, the movable—ends of said parts m are so shaped as to be capable of clasping the headed end of the wire immediately below the head thereof when the said nippers K are swung inward. A vertical rod, L, is so placed in suitable fixed bearings, k' k'', as to be capable of vertical movement therein, and is pressed downward by a suitably-arranged spring, m'. The upper end of said rod L is pivoted, as shown at r, to the forward extremity of a horizontal bar, r', the rear end of which is pivoted to a fixed support, as at r'', the said bar r' having a lateral stud, s', which bears against the circumference of a cam, M, on the driving-shaft B'', so that a vertical movement may be given at intervals to the said rod L. The latter carries a horizontal arm, s'', at the outer extremity of which is a downwardly-projecting spur, t, the lower part of which is conical or wedge shape and placed over the space between the two halves or parts m of the nippers K. When the nippers are moved inward to bring their movable ends in due relation with the headed portion of the wire, as hereinbefore explained, they are in position to receive the blank. The gripping of the blank is done when the reverse or upward movement of the vertical rod L occurs through the agency of the cam M. This gripping occurs substantially simultaneously with the completion of the severing of the headed portion of the wire. The backward or reverse movement of the horizontal arm J brings the said headed portion or blank away from its former position, thereby affording room for the next succeeding descent of the hammer or die F'' to form a head upon the remaining portion of the wire underneath, and for the next upward movement of the wire thus headed to provide another blank.

When the headed blank is brought away, as aforesaid, the movement of the nippers K is such as to bring the said blank in due relation with the mechanism by which the thread is formed upon the body of the blank, the said mechanism, as shown in the drawings, being as follows: Two disks or rollers, N N', arranged to rotate on vertical axes, have their circumferences provided with spiral threads, which, by their conjoint action, as hereinafter explained, form the spiral grooves of the screw on the shank of the blank. Each of these threaded disks or rollers N N' is supported upon a vertical shaft, n n', placed in suitable fixed bearings provided on the frame of the machine, and each has upon the lower end of its said shaft a spur-gear, indicated, respectively, by the reference-letters R R'. These spur-gears R R' gear into a third spur-wheel, R'', upon the lower end of the vertical shaft i. The gear-wheels R and R' mesh with a third gear-wheel, R'', upon the lower end of the vertical shaft i. The gear-wheel R' is of less diameter than the gear-wheel R, and (as both mesh with R'') has a less number of teeth, so that as the two wheels R and R' are simultaneously moved the disk N', which takes motion from R', will rotate more rapidly than the disk N, which takes motion from R.

As both wheels R and R' are moved by the same wheel R, they must rotate in the same direction; but in regard to the disks N and N', (which they respectively move,) as these lie adjacent to each other in the same plane, their adjoining peripherical surfaces will move in opposite directions. The inner peripherical surface of the more rapidly-rotating disk N' moves away from the heading and cutting mechanism, while that of the less rapidly-revolving disk N moves toward the same. Thus the blank will be drawn between the disks from one side to the other of the same away from the heading and cutting mechanism. As the blank passes between the said disks it will be rotated by the motion of the same, and consequently threaded.

In order that the blank, when brought outward away from the heading and cutting mechanism, as hereinbefore explained, may be caused to pass with certainty between the said disks, supplemental mechanism is provided as follows: A horizontal bar, O, underneath the disks is provided with a stem, $f'$, which extends up in the space between said disks, and said bar is so arranged in suitable guides as to be capable of a reciprocating motion parallel to the front of the machine. This reciprocating motion is provided by means of a cam, T, on the shaft $i$, which bears against an upwardly-projecting stud, $S^3$, on the adjacent end of the bar O, the said stud being kept continually in contact with the said cam by means of a spring, $w$, extended therefrom and suitably affixed at its opposite end to the frame of the machine. The rotation of the driving-shaft $B''$, therefore gives the requisite longitudinal movement to the said bar in unison with the other parts of the mechanism. The said bar is provided with an upwardly-projecting stem, $f'$, immediately opposite to and, so to speak, at the inner end of the space between the threaded disks N N'. When the nippers K are swung outward, as described, the horizontal bar O is moved inward, and the blank gripped and held by the nippers K is brought over the space between the stem $f'$ and the adjacent threaded surfaces of the disks N N', which done, the descent of the conically-pointed spur $t$ forces the blank downward from between the two parts $m$ of the nippers, and thereby deposits the blank in the said space, whereupon the said bar O, being moved outward in the direction the reverse of that last described, carries the blank in its vertical position until it is caught between the converging surfaces of the two disks N N', and acted thereon in the manner hereinbefore described—that is to say, by the periphery of one of the said disks moving faster than the other, thereby rotating the blank upon its own axis between and in contact with the threaded circumferential surfaces of the disks— thereby causing said threads to indent or groove the surface of the blank and form a spiral thread thereon, and at the same time slowly carrying the blank between the disks owing to the differential peripherical speed of the latter, until, having passed between the disks, it is deposited on the opposite side thereof and discharged from the machine.

It will be seen that by the construction and operation of the several combinations included in my invention the blank is headed, cut off, and threaded by continuous operations, and that these are rapidly and effectually done, it being, of course, understood that the cutters by which the blank is severed from the wire, as hereinbefore explained, are so shaped as to give a point to the nail during the operation of severing the blank, as aforesaid.

The inner or adjacent surfaces of the gripping-jaws E E', which hold the blank while the same is being headed, as hereinbefore explained, are, of course, perpendicularly recessed to receive the blank or wire. This recess should be enlarged at its upper end below the head-forming recess, as represented in Fig. 6, in order that when the metal is upset to form the head of the nail or like article the upsetting of the metal may be continued for a space below the head—as, for example, at $a^4$—thereby forming an enlargement of the shank or body of the nail immediately below said head.

My improved machine embraces in its organization elements that are common to screw-making and similar machines—such as heading and pointing jaws and seizing-nippers. I am also aware that screws have been formed by the rolling action of the blank caused by the reciprocating movement of dies traveling in opposite direction and compressing the blank between them during this operation, in which the blank is simply rotated on its axis, the dies being grooved obliquely to the path in which they travel; but my improved machine embraces in co-operative organization improved elements, namely: threaded disks or rollers operating with unequal speed for threading the blank, certain means for releasing and forcing the headed blank down from between the carrying-nippers, and means for advancing and delivering the headed blank in position to be received by and between the said threaded disks, all having the relation described for conjoint operation.

What I claim as my invention is—

1. In a machine for making spirally-threaded nails, screws, bolts, and the like, the combination of the following elements, to wit: mechanism for cutting and heading the blank, consisting of the jaws E E, shaft F, provided with heading device $F''$ and proper cutters $e\ e$, for separating the blank, mechanism for transferring the headed blank from the heading-jaws to the threading mechanism, consisting of the nippers K, adapted to be swung in the arc of a circle, and mechanism for threading the blank, consisting of the dies N N', provided with spiral threads adapted to be rotated with unequal surface movements, the said elements being constructed and arranged to operate conjointly, substantially as herein set forth.

2. In a machine for making spirally-threaded nails, screws, bolts, and the like, the threaded disks N N', in combination with means, substantially as described, for giving the same a differential movement of surface in opposite directions, the said disks being arranged opposite each other in such relation as to roll the nail or like article upon its own axis between them, and thus form the spiral groove thereon by the contact of the threaded surfaces of the disks, all substantially as and for the purpose herein set forth.

3. In a machine for making spirally-threaded nails, screws, bolts, and the like, the oppositely-arranged circumferentially-threaded differentially-speeded disks N N', in combination with the nippers K, arranged to carry the blank holding it in a vertical position to the said disks, substantially as and for the purpose herein set forth.

4. In a machine for making spirally-threaded nails, screws, bolts, and the like, the combination, with circumferentially spirally-threaded disks N N', adapted to be rotated, of the bar O, having the upwardly-projecting stem $f'$, and adapted by the cam T and spring $w$ to be reciprocated horizontally to operate said stem in relation to the receiving side of said threading-disks, and mechanism, substantially such as described, whereby the headed blank is gripped, taken from the position in which it was headed, held, carried, and deposited in position to be received between the threading-disks, substantially as described.

5. In a machine for making spirally-threaded nails, screws, bolts, and the like, the combination of the gripping-jaws E E', the die or hammer F, the cutters $e\ e$, and the circumferentially-threaded disks N N', adapted to be rotated with unequal surface speed, with the means, substantially as described, for seizing and holding the headed blank and transferring it by a horizontal swinging movement to a position to be deposited at the receiving side of the threading-disks, and mechanism, substantially such as described, whereby the headed blank is forced downward from between the seizing, holding, and carrying device, in position to be received by said rotating disks, substantially as described.

6. The combination, in a machine for making spirally-threaded nails, bolts, and the like, of the spirally-threaded disks or rollers N N', adapted to have different rates of rotation, with means for effecting such rotation, consisting of the spur-gears R R', having an unequal number of teeth, and consequently of different diameters, arranged upon the shafts of the disks N N', respectively, and the spur-gear R'', by which the spur-gears R R' are actuated, whereby the inner peripherical surface of the disk N' will be more rapidly moved in a direction away from the heading and cutting mechanism than the peripherical surface of the disk N is moved in a direction toward the same, to cause the blank to be seized at one side, carried between said disks, and discharged at the other side of the same.

7. The improved machine herein described for making spirally-threaded nails, bolts, and the like, comprising the following elements in combination, viz: the heading and pointing jaws E E', the circumferentially-threaded disks or rollers N N', operating with unequal surface speed, the nippers K, operating to seize, hold, and carry by a controlled swiveling movement the blank from the heading to the threading mechanism, the reciprocating bar O, having the vertical stem $f'$, operating to deliver the blank between the threading disks or rollers, and mechanism operating to force the headed blank down from between the carrying-nippers in position to be received between the said threading disks or rollers, all constructed and arranged for co-operation, substantially as herein set forth.

THOS. J. SLOAN.

Witnesses:
 ROBT. M. HOOPER,
 DAVID T. S. FULLER.